US011368872B2

(12) United States Patent
Itoh et al.

(10) Patent No.: US 11,368,872 B2
(45) Date of Patent: Jun. 21, 2022

(54) COMMUNICATION APPARATUS, BASE STATION, RADIO RESOURCE ALLOCATION METHOD, AND COMPUTER READABLE MEDIUM

(71) Applicant: NEC CORPORATION, Tokyo (JP)

(72) Inventors: Nobuhiko Itoh, Tokyo (JP); Hiroya Kaneko, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 16/496,691

(22) PCT Filed: Mar. 27, 2017

(86) PCT No.: PCT/JP2017/012444
§ 371 (c)(1),
(2) Date: Sep. 23, 2019

(87) PCT Pub. No.: WO2018/179067
PCT Pub. Date: Oct. 4, 2018

(65) Prior Publication Data
US 2020/0037198 A1  Jan. 30, 2020

(51) Int. Cl.
*H04W 28/02* (2009.01)
*H04W 4/90* (2018.01)
(Continued)

(52) U.S. Cl.
CPC ........ *H04W 28/0268* (2013.01); *H04W 4/90* (2018.02); *H04W 28/0215* (2013.01);
(Continued)

(58) Field of Classification Search
CPC ............. H04W 28/0268; H04W 28/10; H04W 28/0215
See application file for complete search history.

(56) References Cited

U.S. PATENT DOCUMENTS 8,179,855 B2 * 5/2012 Pecen ............... H04W 72/0446
370/330
9,253,681 B1 * 2/2016 Vivanco ................ H04L 5/0064
(Continued)

FOREIGN PATENT DOCUMENTS

EP       3 046 298 A1    7/2016
JP    2010-239431 A    10/2010
(Continued)

OTHER PUBLICATIONS

International Search Report for PCT/JP2017/012444 dated May 9, 2017 (PCT/ISA/210).
(Continued)

*Primary Examiner* — Parth Patel
(74) *Attorney, Agent, or Firm* — Sughrue Mion, PLLC

(57) ABSTRACT

A communication apparatus according to the present disclosure includes: an allocation controller configured to determine to preferentially allocate the radio resources to a control target flow over other flows in an emergency period, which is from a predetermined timing to a transmission deadline of the control target flow, of a transmission period of the control target flow in the radio terminal; and a calculation unit configured to calculate an amount of data that the radio terminal should transmit in a normal period, which is from an occurrence of the control target flow to the predetermined timing, in such a way that transmission of data of an entire control target flow is completed in the emergency period.

16 Claims, 11 Drawing Sheets

(51) Int. Cl.
*H04W 28/10* (2009.01)
*H04W 72/12* (2009.01)

(52) U.S. Cl.
CPC ....... *H04W 28/0236* (2013.01); *H04W 28/10* (2013.01); *H04W 72/1231* (2013.01)

(56) References Cited

U.S. PATENT DOCUMENTS

| | | | |
|---|---|---|---|
| 9,398,593 B2* | 7/2016 | Kubota | H04W 72/0486 |
| 10,455,456 B2* | 10/2019 | Jang | H04W 72/1242 |
| 10,530,469 B2* | 1/2020 | Yun | H04W 74/008 |
| 10,594,527 B2* | 3/2020 | Hasegawa | H04L 5/0007 |
| 2002/0155840 A1* | 10/2002 | Yoshii | H04W 88/181 |
| | | | 455/452.1 |
| 2003/0169746 A1* | 9/2003 | Kitazawa | H04W 28/0236 |
| | | | 370/395.42 |
| 2005/0149470 A1* | 7/2005 | Fujie | H04L 47/50 |
| 2005/0259662 A1* | 11/2005 | Kim | H04W 28/0278 |
| | | | 370/395.4 |
| 2006/0205396 A1* | 9/2006 | Laroia | H04L 1/0033 |
| | | | 455/422.1 |
| 2007/0206534 A1* | 9/2007 | Kwun | H04L 1/0026 |
| | | | 370/329 |
| 2007/0232318 A1* | 10/2007 | Nobukiyo | H04W 72/1252 |
| | | | 455/450 |
| 2009/0252124 A1* | 10/2009 | Yeo | H04W 72/1252 |
| | | | 370/336 |
| 2010/0120359 A1* | 5/2010 | Agarwal | H04B 7/18539 |
| | | | 455/12.1 |
| 2010/0130244 A1* | 5/2010 | Hong | H04W 72/1231 |
| | | | 455/522 |
| 2011/0003599 A1* | 1/2011 | Kanzaki | H04W 72/08 |
| | | | 455/452.2 |
| 2011/0044237 A1* | 2/2011 | Oh | H04B 7/2041 |
| | | | 370/326 |
| 2013/0059595 A1* | 3/2013 | Okubo | H04W 72/1242 |
| | | | 455/452.1 |
| 2014/0010169 A1* | 1/2014 | Novak | H04W 72/085 |
| | | | 370/329 |
| 2014/0098778 A1 | 4/2014 | Valentin et al. | |
| 2014/0269630 A1* | 9/2014 | Kakadia | H04W 4/24 |
| | | | 370/336 |
| 2014/0376369 A1* | 12/2014 | Zhu | H04L 5/14 |
| | | | 370/230 |
| 2015/0120856 A1* | 4/2015 | Bennett | H04L 41/145 |
| | | | 709/213 |
| 2015/0237639 A1* | 8/2015 | Garrett | H04L 1/0003 |
| | | | 370/329 |
| 2015/0257186 A1* | 9/2015 | Fukuta | H04W 76/14 |
| | | | 370/329 |
| 2017/0251489 A1* | 8/2017 | Caretti | H04W 72/1263 |
| 2017/0332392 A1* | 11/2017 | Miao | H04W 72/12 |
| 2018/0042003 A1* | 2/2018 | Chen | H04W 76/10 |
| 2018/0110054 A1* | 4/2018 | Jung | H04W 72/085 |
| 2018/0132136 A1* | 5/2018 | Lu | H04W 28/065 |
| 2018/0270711 A1* | 9/2018 | Moon | H04L 47/27 |
| 2018/0295642 A1* | 10/2018 | Miao | H04W 72/02 |
| 2019/0028231 A1* | 1/2019 | Wang | H04L 1/0041 |
| 2019/0335455 A1* | 10/2019 | Legg | H04W 72/1252 |
| 2019/0357219 A1* | 11/2019 | Wong | H04W 72/0453 |
| 2020/0037198 A1* | 1/2020 | Itoh | H04W 28/0215 |

FOREIGN PATENT DOCUMENTS

| | | |
|---|---|---|
| JP | 2014-522145 A | 8/2014 |
| JP | 2016-136653 A | 7/2016 |
| JP | 2017-17655 A | 1/2017 |
| WO | 03/085934 A1 | 10/2003 |

OTHER PUBLICATIONS

Communication dated Sep. 15, 2020, from the Japanese Patent Office in Application No. 2019-508365.

* cited by examiner

COMMUNICATION APPARATUS, BASE STATION, RADIO RESOURCE ALLOCATION METHOD, AND COMPUTER READABLE MEDIUM

CROSS REFERENCE TO RELATED APPLICATIONS

This application is a National Stage of International Application No. PCT/JP2017/012444 filed Mar. 27, 2017.

TECHNICAL FIELD

The present disclosure relates to a communication apparatus, a base station, a radio resource allocation method, and a program.

BACKGROUND ART

It is currently being examined how to provide ultra low latency services via a mobile network. The ultra low latency services may include, for example, an automatic driving service that transmits in-vehicle sensor information, traffic camera information, map information and the like via a mobile network.

Mobile carriers (mobile telecommunications carriers) need to guarantee Service Level Agreement (SLA) in order to provide ultra low latency services for users. Delay time that is guaranteed in the ultra low latency services may be, for example, defined in the SLA.

For example, Patent Literature 1 discloses efficiently allocating radio resources to User Equipment (UE) in order to maintain a high service quality. Specifically, Patent Literature 1 discloses optimizing allocation of radio resources in view of information on a delay constraint or the like of an application. In other words, Patent Literature 1 discloses that a base station optimizes allocation of the radio resources so that a delay time does not exceed an allowable delay time when an application service is provided, thereby maintaining a high service quality.

CITATION LIST

Patent Literature

[Patent Literature 1] Published Japanese Translation of PCT International Publication for Patent Application, No. 2014-522145

SUMMARY OF INVENTION

Technical Problem

One technique for preventing the delay time from exceeding the allowable delay time when the base station provides the application service is to allocate radio resources as follows. If, for example, the delay time in a radio terminal that is receiving the application service is likely to exceed the allowable delay time, the base station may preferentially allocate radio resources to this radio terminal. However, there is a case in which so much data is accumulated in a transmission buffer of a radio terminal that all the pieces of data cannot be transmitted even when the radio resources are preferentially allocated to the radio terminal shortly before the end of the allowable delay time. In this case, a problem that the SLA cannot be guaranteed by just preferentially allocating the radio resources to the radio terminal shortly before the end of the allowable delay time occurs.

An object of the present disclosure is to provide a communication apparatus, a base station, a radio resource allocation method, and a program capable of efficiently performing scheduling of the radio resources in such a way that a radio terminal is able to complete transmission of data within an allowable time.

Solution to Problem

A communication apparatus according to a first aspect of the present disclosure includes a calculation unit configured to calculate an amount of data that a radio terminal should transmit in a second period, which is from an occurrence of a flow to a predetermined timing, in such a way that transmission of data of an entire flow can be completed in a first period, which is from the predetermined timing to a transmission deadline of the flow, of a transmission period of the flow in the radio terminal.

A base station according to a second aspect of the present disclosure includes: a communication unit configured to receive, from a communication apparatus, information regarding an amount of data a radio terminal should transmit in a second period, which is from an occurrence of a flow to a predetermined timing in such a way that transmission of data of an entire flow can be completed in a first period, which is from the predetermined timing to a transmission deadline of the flow, of a transmission period of the flow in the radio terminal; and an allocation unit configured to determine radio resources to be allocated to the flow in the second period based on the amount of data that the radio terminal should transmit in the second period.

A radio resource allocation method according to a third aspect of the present disclosure includes calculating an amount of data that a radio terminal should transmit in a second period, which is from an occurrence of a flow to a predetermined timing, in such a way that transmission of data of an entire flow can be completed in a first period, which is from the predetermined timing to a transmission deadline of the flow, of a transmission period of the flow in the radio terminal.

A program according to a fourth aspect of the present disclosure causes a computer to calculate an amount of data that a radio terminal should transmit in a second period, which is from an occurrence of a flow to a predetermined timing, in such a way that transmission of data of an entire flow can be completed in a first period, which is from the predetermined timing to a transmission deadline of the flow, of a transmission period of the flow in the radio terminal.

Advantageous Effects of Invention

According to the present disclosure, it is possible to provide a communication apparatus, a base station, a radio resource allocation method, and a program capable of efficiently performing scheduling of the radio resources in such a way that the radio terminal is able to complete transmission of data within an allowable time.

DESCRIPTION OF EMBODIMENTS

First Example Embodiment

Figure 1:
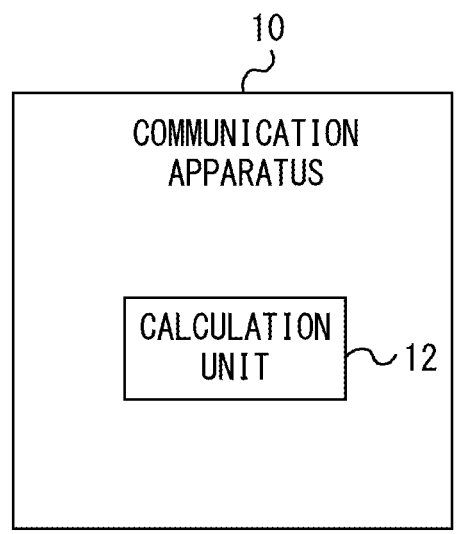
FIG. 1 is a configuration diagram of a communication apparatus according to a first example embodiment.

Hereinafter, with reference to the drawings, example embodiments according to the present disclosure will be explained. With reference to FIG. 1, a configuration example of a communication apparatus 10 according to a first example embodiment will be explained. The communication apparatus 10 may be a computer apparatus that is operated by a processor executing a program stored in a memory.

The communication apparatus 10 may be, for example, a Service Capability Exposure Function (SCEF) entity (hereinafter it will be referred to as an SCEF) defined by the 3rd Generation Partnership Project (3GPP). The SCEF executes, for example, authentication processing or the like regarding an application server managed by a mobile telecommunications carrier, an application service provider or the like. Further, the SCEF communicates with an evolved NodeB (eNB), which is a base station, via reference points defined by the 3GPP. The SCEF entity transmits, for example, control data in a core network. The control data is used, for example, to perform configuration or the like of a communication path that transmits user data regarding a radio terminal. The SCEF entity may be referred to as, for example, a C-Plane Function (CPF) entity, which is a node apparatus that transmits the control data.

Further, the communication apparatus 10 may be a Mobile Edge Computing (MEC) server. The MEC server may be arranged in a position that enables the MEC server to directly communicate with the base station. The position that enables the MEC server to directly communicate with the base station is a position that enables the MEC server to communicate with the base station without passing through a core network managed by a mobile telecommunications carrier. For example, the MEC server may be physically integrated with the base station. Alternatively, the MEC server may be installed in the same building as the base station and may be connected to a Local Area Network (LAN) in the building so that it can communicate with the base station. The MEC server is arranged in the vicinity of the base station, whereby it becomes possible to reduce the transmission delay between the MEC server and the radio terminal. The MEC server is used, for example, to provide an ultra low latency application service.

Further, the communication apparatus 10 may be arranged in an IoT platform that includes servers that provide IoT services for the radio terminal. Alternatively, the communication apparatus 10 may be a server apparatus capable of communicating with the base station directly or via a network. The communication apparatus 10 may have any one of a Control Plane function and a User Plane function regardless of whether the communication apparatus 10 is the apparatus illustrated above or it is another apparatus. The communication apparatus 10 may further be a base station.

Next, a configuration example of the communication apparatus 10 will be explained. The communication apparatus 10 includes a calculation unit 12. The calculation unit 12 may be software or a module whose processing is executed by a processor executing a program stored in a memory. Further, the calculation unit 12 may be hardware such as a chip or a circuit.

The calculation unit 12 calculates an amount of data that the radio terminal should transmit in a second period, which is from an occurrence of a flow to a predetermined timing, in such a way that transmission of data of an entire flow can be completed in a first period, which is from the predetermined timing to a transmission deadline of the flow, of a transmission period of the flow in the radio terminal. The length of the first period and the predetermined timing may be different or the same for each flow. The first period may be determined, for example, based on an application service. Alternatively, the first period may be determined based on a congestion degree (e.g., a traffic amount) of the network. The first period may become longer as the congestion degree of the network is larger. Further, the first period may be determined based on the number of radio terminals connected to the base station. The first period may become longer as the number of radio terminals connected to the base station becomes larger.

The flow regarding the radio terminal includes, for example, one or a plurality of pieces of data transmitted in the application service provided for the radio terminal. Further, data included in the flow may be referred to as a data packet. The flow regarding the radio terminal may be a flow transmitted from the radio terminal to the base station or a flow transmitted from the base station to the radio terminal. Alternatively, the flow regarding the radio terminal may include the flow transmitted from the radio terminal to the base station and the flow transmitted from the base station to the radio terminal. The data included in the flow transmitted from the radio terminal to the base station is referred to as Uplink (UL) data. Further, the data included in the flow transmitted from the base station to the radio terminal is referred to as Downlink (DL) data. The data transmitted in the application service (e.g., application data) may be, for example, image data, video data or the like. Further, the application data may include, for example, a request message for requesting transmission of the image data or the like or a response message in response to the request message.

The transmission deadline means a deadline to complete transmission of a plurality of data packets included in one flow. The transmission deadline is requested by an application. The transmission deadline can also be referred to as a transmission time limit. Alternatively, the transmission deadline can also be referred to as a maximum transmission delay allowed by the application. The transmission deadline can be defined in various ways. The transmission deadline may indicate, for example, a completion deadline of the transmission by a sender of an application layer. Alternatively, the transmission deadline may indicate a completion deadline of the transmission by a sender of a radio layer. Alternatively, the transmission deadline may indicate a completion deadline of reception by a receiver of the application layer. Alternatively, the transmission deadline may indicate a completion deadline of reception by a receiver of the radio layer. Alternatively, more specifically, the transmission deadline may indicate a deadline for the receiver of the application layer to complete reception of the last data packet regarding one flow after the sender of the application layer has started transmission of the first data packet regarding one flow. Alternatively, the transmission deadline may indicate a deadline for the receiver of the radio layer to complete reception of the last data packet regarding one flow after the sender of the radio layer has started transmission of the first data packet regarding one flow.

The information regarding the transmission deadline may be received by the communication apparatus 10 from the application server. The communication apparatus 10 may determine, regarding data delivered to the user plane of the communication apparatus 10, the service to be applied to this data, and may determine the transmission deadline based on this service. The communication apparatus 10 may further receive information regarding the service to be applied to the data from the application server and determine the transmission deadline based on this service. The communication apparatus 10 may receive information on the buffer of the eNB from the eNB, and preferentially allocate resource blocks to flows accumulated in the buffer.

As described above, the communication apparatus 10 is able to calculate the amount of data that the radio terminal should transmit in the second period. That is, the radio terminal transmits the predetermined amount of data in the second period, whereby it is possible to prevent a situation in which the radio terminal cannot complete transmission of all the pieces of data in the first period.

Further, the communication apparatus 10 may transmit information regarding the amount of data that the radio terminal should transmit in the second period to the base station. The base station executes scheduling for allocating the radio resources to the flow regarding the radio terminal. The scheduling executed in the base station may be referred to as Medium Access Control (MAC) scheduling, packet scheduling or the like. The base station is able to determine the radio resources to be allocated to the control target flow by receiving the information regarding the amount of data that the radio terminal should transmit in the second period from the communication apparatus 10. Alternatively, the communication apparatus 10 may determine, in place of the base station, the radio resources to be allocated to the control target flow based on the amount of data that the radio terminal should transmit in the second period.

Second Example Embodiment

Figure 2:
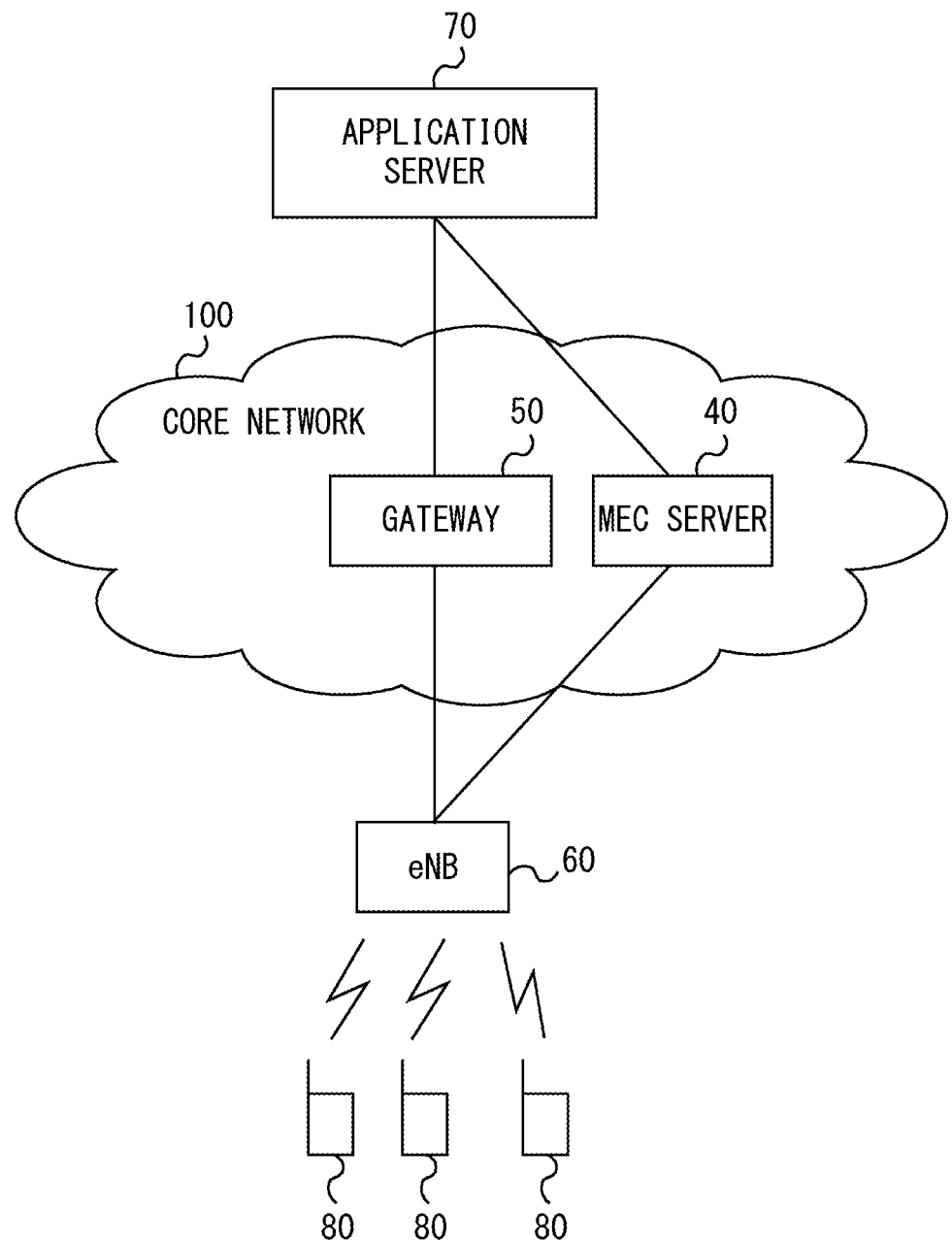
FIG. 2 is a configuration diagram of a communication system according to a second example embodiment.

With reference next to FIG. 2, a configuration example of a communication system according to a second example embodiment of the present disclosure will be explained. The communication system shown in FIG. 2 shows a communication system defined in the 3GPP. The communication system shown in FIG. 2 includes an eNB 60, an application server 70, a core network 100, and a plurality of UEs 80. The UE 80 is a general term for the communication terminal defined by the 3GPP. The core network 100 is a network managed by a mobile telecommunications carrier. The core network 100 includes an MEC server 40 and a gateway 50. The MEC server 40 corresponds to the communication apparatus 10 shown in FIG. 1.

The gateway 50 may be, for example, a Serving Gateway (SGW) or a Packet Data Network Gateway (PGW) that transmits user data regarding the UE 80 in the core network 100. Alternatively, the gateway 50 may be a U-Plane Function (UPF) entity, which is a node apparatus that transmits user data regarding the UE 80. The user data may be, for example, image data, video data or the like.

The MEC server 40 is arranged in the vicinity of the eNB 60 and provides the application service for the UEs 80 via the eNB 60. Further, the MEC server 40 provides the application service for the UEs 80 in collaboration with the application server 70.

The application server 70 is a server that provides the application service for the UEs 80. The application server 70 transmits, for example, the user data to the gateway 50. Further, the application server 70 transmits the data size of the user data to be transmitted in one flow, and further information regarding the transmission deadline in one flow to the MEC server 40.

The gateway 50 transmits user data transmitted from the application server 70 to the eNB 60. The gateway 50 further transmits the user data transmitted from the eNB 60 to the application server 70.

The MEC server 40 calculates the amount of data that can be transmitted in an emergency period of the flow regarding the UE 80 and the amount of data that should be transmitted in the normal period using the information transmitted from the application server 70. The MEC server 40 may perform scheduling of the radio resources based on the results of the calculation or transmit the results of the calculation to the eNB 60. When the MEC server 40 has performed scheduling of the radio resources, the MEC server 40 transmits the results of the scheduling to the eNB 60.

The emergency period, which corresponds to the first period in the first example embodiment, is a period from the predetermined timing to the transmission deadline of the control target flow of the transmission period of the control target flow. In the emergency period of the control target flow, radio resources are preferentially allocated to the control flow over the other flows. Further, in a period before the emergency period (this corresponds to the second period in the first example embodiment), that is, in a period from an occurrence of the control target flow to the predetermined timing (hereinafter this period will be referred to as a normal period), a large number of radio resources are allocated to a flow regarding the radio terminal whose radio quality is high. Therefore, a larger number of radio resources are preferentially allocated to the flow regarding the radio terminal whose radio quality is high compared to the flow regarding the radio terminal whose radio quality is not high.

When the eNB 60 has received, from the MEC server 40, the information regarding the amount of data that should be transmitted in the normal period, the eNB 60 performs scheduling based on the received information and allocates the radio resources to the flow of the UE 80. Further, when the eNB 60 has received the results of the scheduling from the MEC server 40, the eNB 60 allocates the radio resources to the flow of the UE 80 in accordance with the results of the scheduling that have been received.

Figure 3:
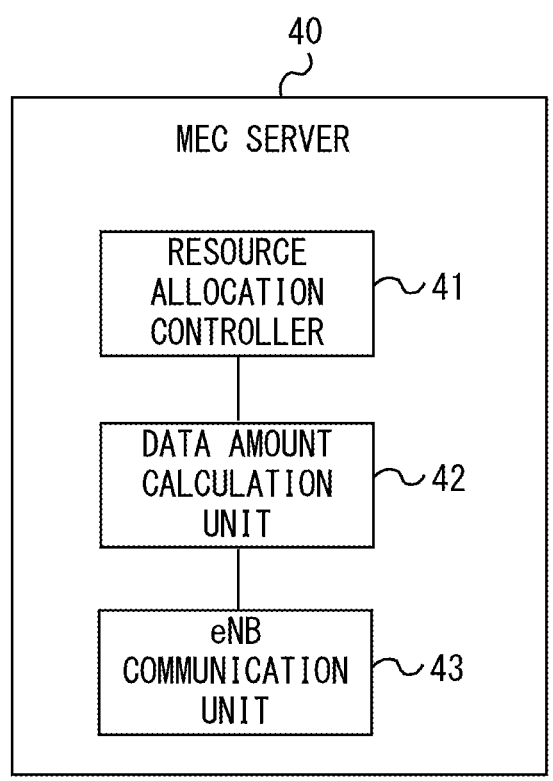
FIG. 3 is a configuration diagram of an MEC server according to the second example embodiment.

With reference next to FIG. 3, a configuration example of the MEC server 40 according to the second example embodiment will be explained. The MEC server 40 includes a resource allocation controller 41, a data amount calculation unit 42, and an eNB communication unit 43. The components of the MEC server 40 such as the resource allocation controller 41, the data amount calculation unit 42, and the eNB communication unit 43 may each be software or a module whose processing is executed by a processor executing a program stored in a memory. Further, the components of the MEC server 40 may each be hardware such as a circuit or a chip.

The resource allocation controller 41 sets the normal period and the emergency period for each of the plurality of flows occurred in the eNB 60. The MEC server 40 acquires information regarding a plurality of flows that occur in the eNB 60 from the application server 70. The MEC server 40 acquires, for example, information regarding the transmission deadline of each flow and the data size (the amount of data).

The resource allocation controller 41 may define, for example, a certain percentage of period of the transmission period from the occurrence of the flow to the transmission deadline, which is the period whose end corresponds to the transmission deadline to be the emergency period. Specifically, the emergency period may be defined to be a period of 10% of the transmission period.

Further, the resource allocation controller 41 counts the number of flows that have the emergency period that overlaps the emergency period of the control target flow.

Figure 4:
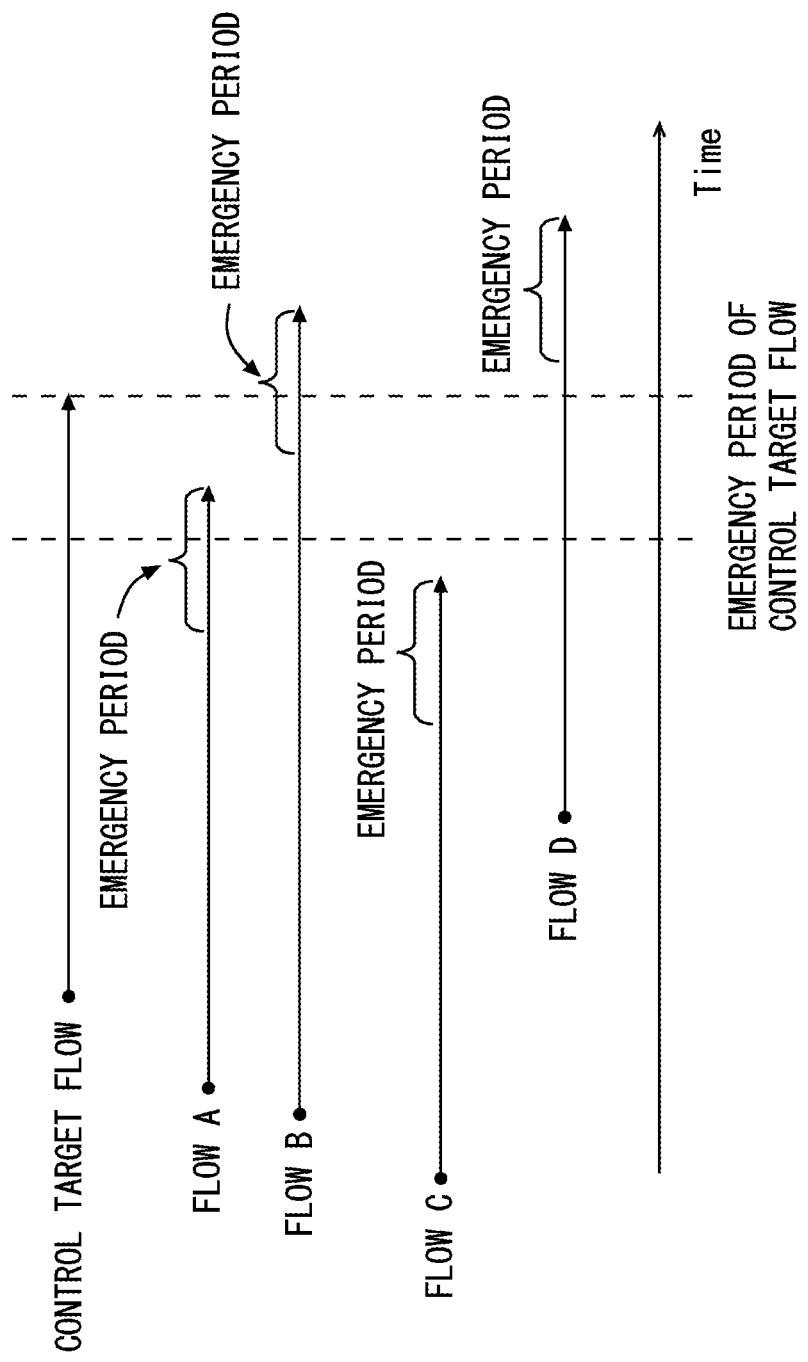
FIG. 4 is a diagram for explaining an emergency period that overlaps an emergency period of a control target flow according to the second example embodiment.

With reference to FIG. 4, the emergency period that overlaps the emergency period of the control target flow will be explained. The horizontal axis in FIG. 4 indicates time. The straight arrows shown in FIG. 4 indicate the transmission period from the time each flow has occurred to the transmission deadline. The period shown by dotted lines indicates the emergency period of the control target flow. In FIG. 4, a flow A and a flow B indicate that the control target flow and the emergency period overlap each other. Further, a flow C and a flow D indicate that the control target flow and the emergency period do not overlap each other.

In the case of the flow shown in FIG. 4, the resource allocation controller 41 counts that the number of flows that have the emergency period that overlaps the emergency period of the control target flow is three, including the control target flow.

Next, the resource allocation controller 41 estimates the amount of data that the UE 80 can transmit by the control target flow in the emergency period of the control target flow. When the amount of data that the control target flow can transmit is denoted by Estimation[bit], Estimation can be calculated using the following Expression 1.

Estimation[bit]=allocation period per flow×the number of RBs allocated per flow×transmission capability　　　(Expression 1)

The allocation period per flow is defined to be emergency period [TTI]/count value. The emergency period is indicated by units of Transmission Time Interval (TTI). The count value is the number of flows that have the emergency period that overlaps the emergency period of the control target flow.

The number of Resource Blocks (RBs) to be allocated per flow is defined to be the number of RBs per TTI [RB/TTI]/concurrently processible scheduling number. The concurrently processible scheduling number indicates the number of UEs and the number of flows that can be concurrently processed per TTI. The number of UEs and the number of flows that can be concurrently processed may be, for example, the upper limit values of the number of UEs and the number of flows that can be concurrently scheduled.

The transmission capability is the number of bits that can be transmitted per RB. It is assumed, for example, that the transmission capability is defined for each Modulation and Coding Scheme (MCS). The transmission capability used in Expression 1 may be determined, for example, based on MCS at the time each flow has occurred. Alternatively, the transmission capability used in Expression 1 may be determined in view of fluctuation of the previous MCS. The transmission capability used in Expression 1 may be determined, for example, based on the average value of the previous MCS. Alternatively, the MCS may be analyzed from its fluctuation whether the MCS tends to increase or decrease, and the transmission capability used in Expression 1 may be determined based on the MCS estimated in the emergency period of each flow.

The resource allocation controller 41 may count the number of flows that have the emergency period that overlaps the emergency period of the control target flow at the first timing in the normal period. The resource allocation controller 41 may re-calculate the amount of data that the UE 80 can transmit in the emergency period of the control target flow using the number of flows. The first timing indicates an arbitrary timing in the normal period.

The information regarding the MCS at the time the flow has occurred or the previous MCS may be received from the eNB 60 via the eNB communication unit 43.

Next, the data amount calculation unit 42 calculates the amount of data that the control target flow should transmit in the normal period. When the amount of data that the control target flow should transmit in the normal period is denoted by Data and the amount of data of the control target flow is denoted by FlowSize, this data amount is calculated using the following Expression 2.

Data=FlowSize−Estimation　　　(Expression 2)

The eNB communication unit 43 transmits the information regarding the amount of data that the control target flow should transmit in the normal period, the amount of data having been calculated in the data amount calculation unit 42, to the eNB 60.

Figure 5:
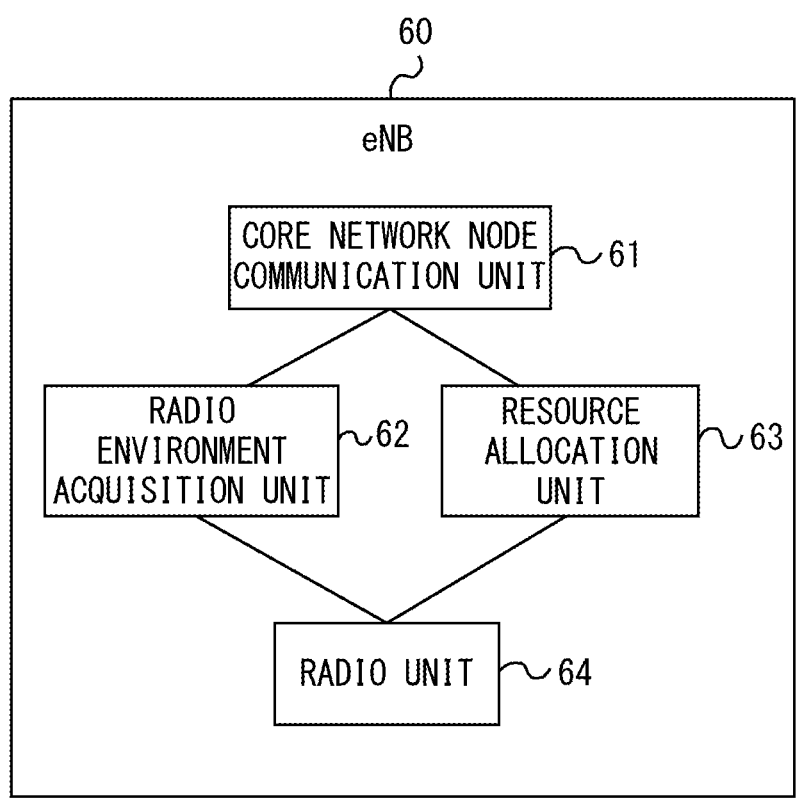
FIG. 5 is a configuration diagram of an eNB according to the second example embodiment.

With reference next to FIG. 5, a configuration example of the eNB 60 will be explained. The eNB 60 includes a core network node communication unit 61, a radio environment acquisition unit 62, a resource allocation unit 63, and a radio unit 64. The components of the eNB 60 such as the core network node communication unit 61, the radio environment acquisition unit 62, the resource allocation unit 63, and the radio unit 64 may be software or a module whose processing is executed by a processor executing a program stored in a memory. Alternatively, the components of the eNB 60 may be hardware such as a circuit or a chip.

The radio environment acquisition unit 62 measures the communication quality of the radio resources for transmitting UL data using the UL data received from the UE 80 via the radio unit 64. Further, the radio environment acquisition unit 62 receives the communication quality of the radio resources that transmit DL data measured using the DL data in the UE 80 from the UE 80. The radio environment acquisition unit 62 receives information regarding the communication quality of the radio resources that transmit the DL data from the UE 80 via the radio unit 64.

The radio environment acquisition unit 62 transmits the communication quality of the radio resources that transmit the UL and DL data to the MEC server 40 via the core network node communication unit 61.

The resource allocation unit 63 receives information regarding the amount of data that the control target flow should transmit in the normal period via the core network node communication unit 61, the information being transmitted from the MEC server 40. The resource allocation unit 63 determines the radio resources to be allocated to the control target flow in the normal period based on the received information.

For example, the resource allocation unit 63 may allocate radio resources to the control target flow in such a way that the amount of data that should be transmitted can be transmitted in the normal period of the control target flow even when the radio quality of the UE 80 regarding the control target flow is worse than radio qualities of other UEs 80. The resource allocation unit 63 may allocate, for example, radio resources to the control target flow in preference to the other flows in an arbitrary period in the normal period of the control target flow.

The radio unit 64 transmits the DL data to the UE 80 using the radio resources determined in the resource allocation unit 63. Further, the radio unit 64 transmits information regarding the radio resources that are used to transmit the UL data to the UE 80.

Here, when the resource allocation unit 63 has received, from the MEC server 40, allocation information of the radio resources in which the radio resources to be allocated are specified, via the core network node communication unit 61, the resource allocation unit 63 may determine the radio resources to be allocated to the control target flow in accordance with the received information.

Figure 6:
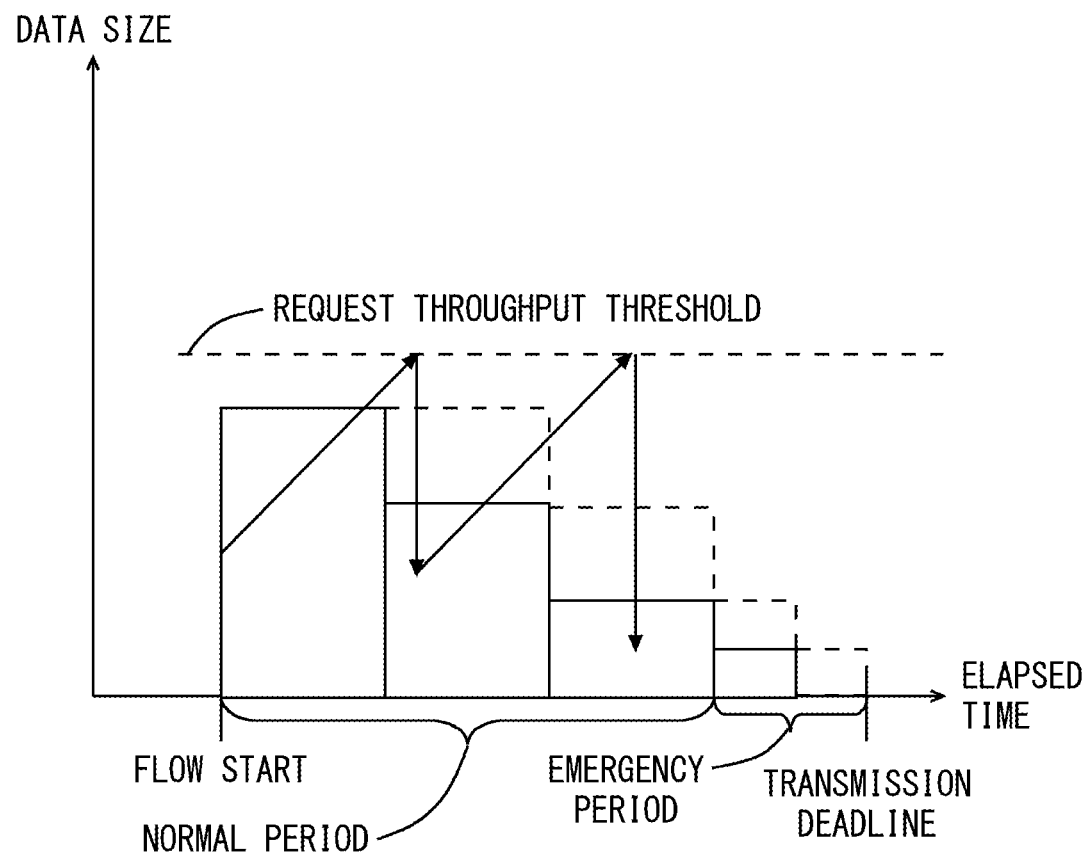
FIG. 6 is a diagram for explaining data transmission processing in a normal period of the control target flow according to the second example embodiment.

With reference now to FIG. 6, one example of the data transmission processing in the normal period of the control target flow in the resource allocation unit 63 will be explained. A description will be given taking an example in which the vertical axis shown in FIG. 6 represents the data size and the horizontal axis represents elapsed time. FIG. 6 shows a transition of the amount of remaining data during the time from the occurrence of the control target flow to the transmission deadline. The solid rectangles indicate the amount of data of the control target flow. In other words, the solid rectangles indicate the amount of remaining data of the control target flow that should be transmitted by the transmission deadline. Further, the dotted rectangles indicate the amount of data that has already been transmitted.

The arrows in FIG. 6 indicate request throughput. The request throughput is a value obtained by dividing the amount of remaining data that should be transmitted in the normal period using the remaining time in the normal period. The amount of remaining data that should be transmitted in the normal period is a difference between the amount of data to be transmitted in the normal period and the amount of data that has been transmitted during the period from the occurrence of the control target flow to the second timing in the normal period. Further, the remaining time in the normal period is a time period from the above second timing in the normal period to a predetermined timing, which is the end of the normal period. The second timing indicates an arbitrary timing in the normal period. The upward-sloping arrows shown in FIG. 6 indicate that the request throughput increases with time. Further, in FIG. 6, when the request throughput has reached a request throughput threshold, the radio resources are preferentially allocated to the control target flow and the amount of remaining data of the control target flow is reduced. Since a part of the data of the control target flow is transmitted and the amount of remaining data is reduced, the request throughput is also reduced. After that, in the period in which the data of the control target flow is not transmitted, the request throughput is increased.

The request throughput threshold is a value that is used to preferentially transmit the data in the normal period of the control target flow even when the radio quality of the control target flow is low and the radio resources cannot be allocated to the control target flow. Further, when the radio quality of the control target flow is high, that is, when the radio quality is high, data is transmitted before the request throughput reaches the request throughput threshold.

While FIG. 6 shows that the request throughput threshold has a fixed value, the request throughput threshold may be updated to a new value every time the amount of remaining data is reduced.

The data transmission processing in the normal period of the control target flow in FIG. 6 may be executed in the data amount calculation unit 42 of the MEC server 40 or may be executed in the eNB 60 that will be described later.

The timing of the transmission of the data using the request throughput threshold in FIG. 6 may be calculated in the MEC server 40 and the resource allocation unit 63 may allocate the radio resources to the control target flow in accordance with the timing calculated in the MEC server 40.

Figure 7:
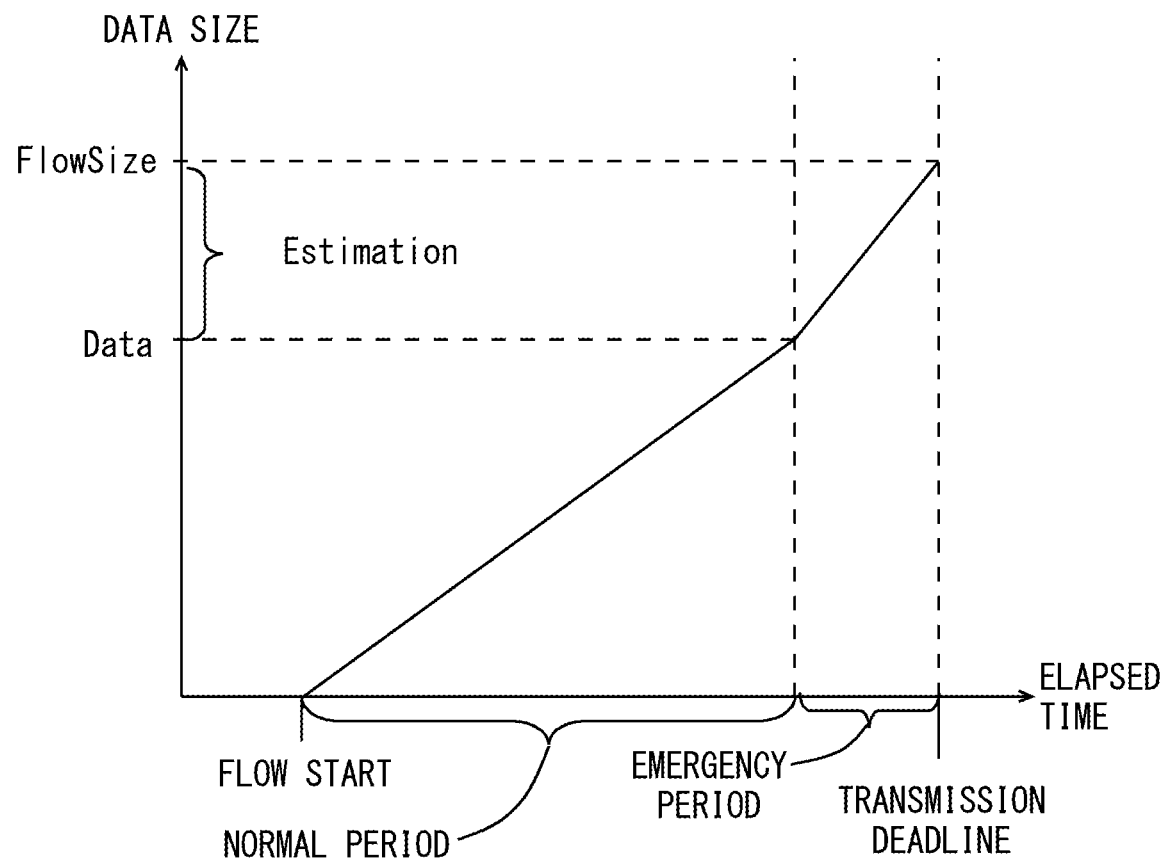
FIG. 7 is a diagram for explaining data transmission processing in the normal period of the control target flow according to the second example embodiment.

With reference next to FIG. 7, one example of the data transmission processing different from that shown in FIG. 6 will be explained. A description will be given taking an example in which the vertical axis shown in FIG. 7 represents the data size and the horizontal axis represents the elapsed time. The vertical axis in FIG. 7 indicates Data calculated in Expression 2 and FlowSize of the control target flow. The diagonal solid line shown in FIG. 7 indicates the amount of data that should be transmitted at each timing. Specifically, the diagonal solid line shown in FIG. 7 shows that the amount of data that should be transmitted in the normal period and the emergency period is increased with time. In other words, when radio resources are not allocated to the control target flow in the normal period and the emergency period, this state indicates that the amount of data that should be transmitted is increased with time.

The resource allocation unit 63 plots the amount of data transmitted in the normal period in the graph shown in FIG. 7. The amount of data transmitted in the normal period may be, above all, the amount of data that has been transmitted from the occurrence of the control target flow to an arbitrary timing in the normal period. In this case, the resource allocation unit 63 may preferentially allocate the radio resources to the control target flow when the plotted position is lower than the diagonal solid line. Further, the resource allocation unit 63 may not preferentially allocate the radio resources to the control target flow when the plotted position exceeds the diagonal solid line and may allocate the radio resources to the control target flow when the radio quality is high.

Figure 8:
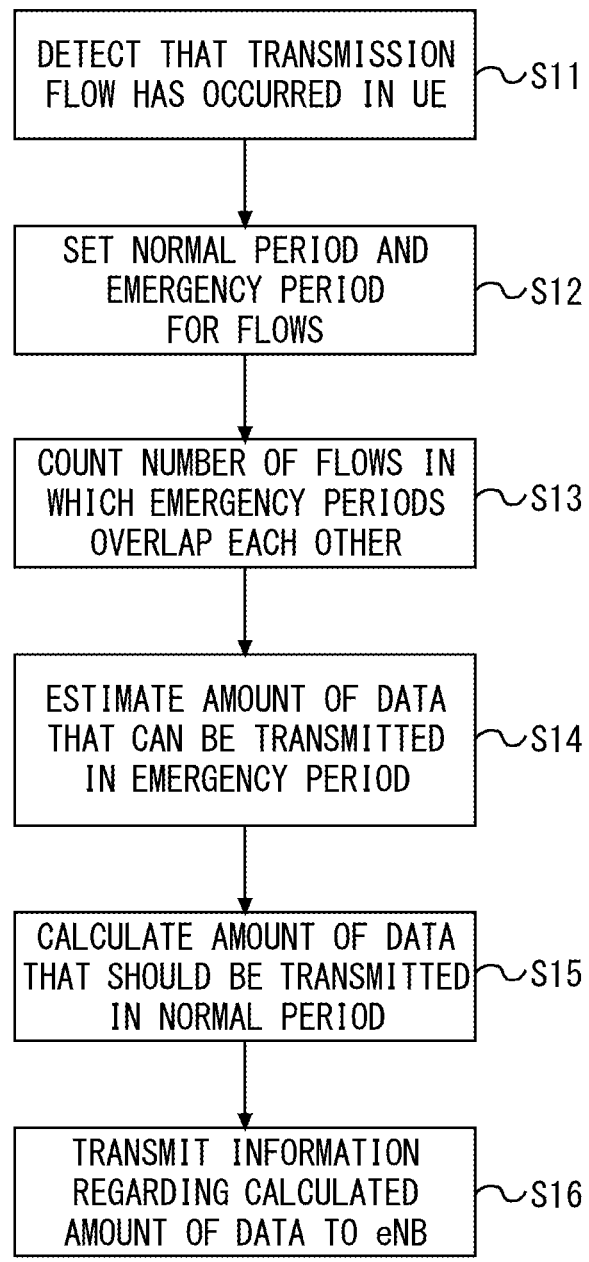
FIG. 8 is a diagram showing a flow of processing of calculating an amount of data to be transmitted in the normal period of the control target flow in the MEC server according to the second example embodiment.

With reference next to FIG. 8, a flow of processing of calculating the amount of data to be transmitted in the normal period of the control target flow in the MEC server 40 will be explained. First, the MEC server 40 detects that the transmission flow has occurred in the UE 80 (S11). The MEC server 40 may receive, for example, a notification indicating that the transmission flow has occurred in the UE 80 from the application server 70. In the following description, the occurred transmission flow will be described as the control target flow.

Next, the resource allocation controller 41 sets the normal period and the emergency period for a plurality of flows to which the radio resources are to be allocated in the eNB 60, the plurality of flows including the control target flow (S12).

Next, the resource allocation controller 41 counts the number of flows that have the emergency period that overlaps the emergency period of the control target flow (S13). Next, the resource allocation controller 41 estimates the amount of data that the control target flow can transmit in the emergency period of the control target flow (S14). The resource allocation controller 41 may use MCS indicating the radio quality between the UE 80 and the eNB 60 at the timing the control target flow has occurred when it estimates the amount of data that the control target flow can transmit, or may estimate MCS in the emergency period of the control target flow and use the estimated MCS.

Next, the data amount calculation unit 42 calculates the amount of data that the control target flow should transmit in the normal period (S15). The data amount calculation unit 42 calculates the amount of data that should be transmitted in the normal period by subtracting the amount of data estimated in Step S14 from the amount of data of the entire control target flow.

Next, the eNB communication unit 43 transmits information regarding the amount of data calculated in Step S15 to the eNB 60.

As described above, the MEC server 40 according to the second example embodiment is able to estimate the amount of data that can be transmitted in the emergency period of the control target flow. Further, the MEC server 40 is able to calculate the amount of data that should be transmitted in the normal period in such a way that the transmission of the control target flow can be completed in the emergency period.

Further, the eNB 60 is able to allocate radio resources to the control target flow in the normal period of the control target flow in accordance with the amount of data that should be transmitted in the normal period calculated in the MEC server 40. As a result, the UE 80 is able to transmit the amount of data calculated in the MEC server 40 in the normal period. Accordingly, the UE 80 is able to complete transmission of all the pieces of data of the control target flow in the emergency period. As a result, the UE 80 is able to complete transmission of all the pieces of data of the control target flow by the transmission deadline.

Third Example Embodiment

Figure 9:
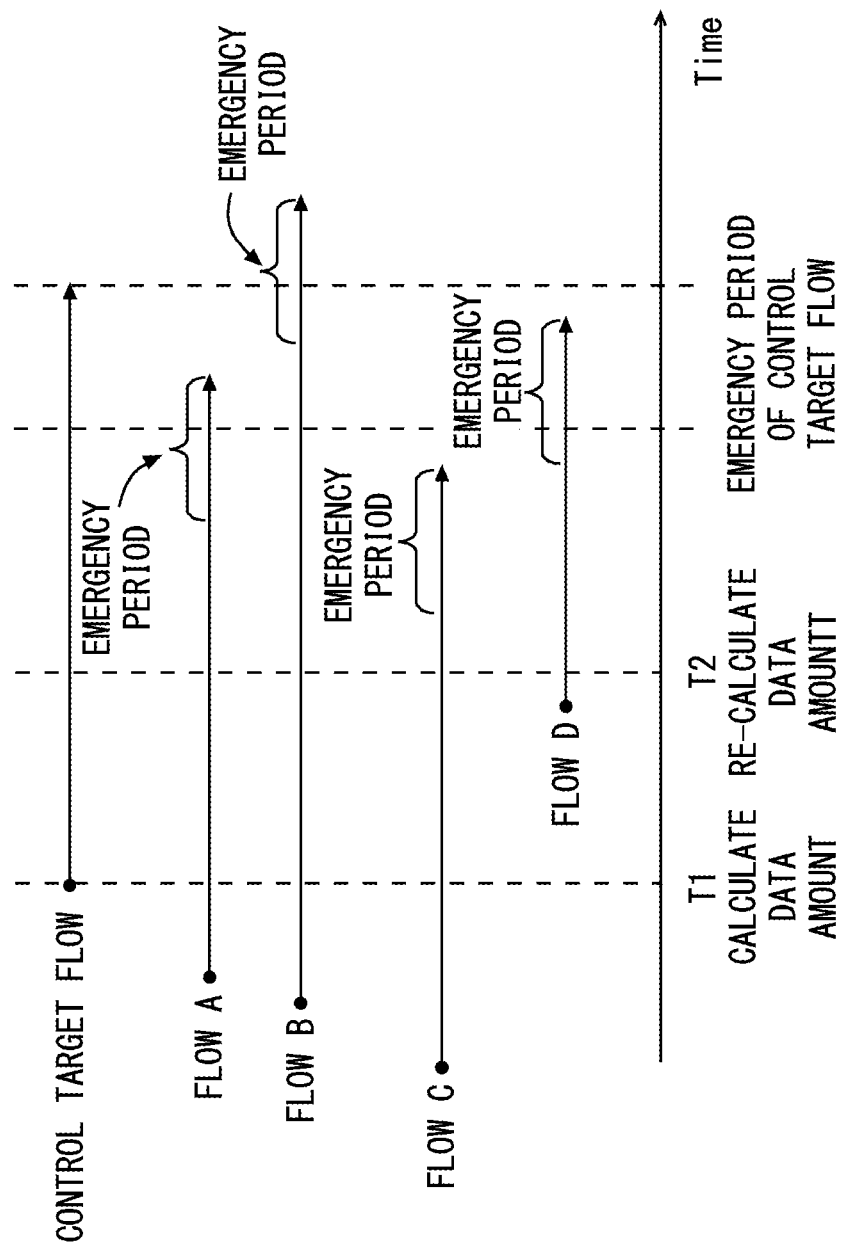
FIG. 9 is a diagram for explaining processing of calculating an amount of data to be transmitted in a normal period of a control target flow in an MEC server according to a third example embodiment.

With reference next to FIG. 9, processing of calculating the amount of data that should be transmitted in the normal period of the control target flow in the MEC server 40 according to the third example embodiment will be explained.

In the second example embodiment, the operation in which the resource allocation controller 41 counts the number of flows that have the emergency period that overlaps the emergency period of the control target flow at time T1 at which the control target flow has occurred has been described. In the third example embodiment, further, at time T2, which is the timing after a predetermined period from time T1, the resource allocation controller 41 counts again the number of flows that have the emergency period that overlaps the emergency period of the control target flow.

The number of flows counted at time T1 may be different from the number of flows counted at time T2. Regarding the flow A in FIG. 9, for example, a large number of radio resources may be allocated between time T1 and time T2, which may cause a situation in which the timing the transmission of all the pieces of data of the flow A is completed becomes earlier. When, for example, the transmission of the flow A has been completed before the emergency period of the control target flow is started, the emergency period of the control target flow and the emergency period of the flow A do not overlap each other. As a result, while the resource allocation controller 41 counts the flow A at time T1, the flow A is not counted at time T2.

Further, at time T1, even when the flow D has not occurred, the flow D may occur between time T1 and time T2. When the emergency period of the flow D and the emergency period of the control target flow overlap each other as shown in FIG. 9, the resource allocation controller 41 counts the flow D at time T2.

When the time has passed as described above, the number of flows that have the emergency period that overlaps the emergency period of the control target flow may vary. The resource allocation controller 41 estimates again the amount of data that can be transmitted in the emergency period of the control target flow when the number of flows that have the emergency period that overlaps the emergency period of the control target flow has been counted at time T2.

When, for example, the number of flows at time T2 is smaller than the number of flows at time T1, the allocation period in which the radio resources are allocated to the control target flow increases. Therefore, the amount of data that can be transmitted in the emergency period of the control target flow increases, which results in a situation in which the amount of data that should be transmitted in the normal period of the control target flow is reduced.

Further, it is assumed that the transmission capability is determined in accordance with the radio quality information at time T1 when the amount of data that can be transmitted in the emergency period of the control target flow is estimated. In this case, the transmission capability may be determined in accordance with the radio quality information at time T2.

As described above, by executing processing of calculating the amount of data to be transmitted in the normal period of the control target flow in the MEC server 40 according to the third example embodiment, the amount of data that should be transmitted in the normal period can be calculated more accurately.

Fourth Example Embodiment

Next, processing of counting the number of flows according to a fourth example embodiment will be explained. In the second and third example embodiments, the resource allocation controller 41 counts the number of flows that have the emergency period that overlaps the emergency period of the control target flow. On the other hand, in the fourth example embodiment, the resource allocation controller 41 counts the number of flows in which the transmission deadline exists in the emergency period of the control target flow.

The flow B is to be counted when, for example, the number of flows having the emergency period that overlaps the emergency period of the control target flow is counted in FIG. 9. On the other hand, the transmission deadline of the flow B does not exist in the emergency period of the control target flow. The transmission deadline of each flow shown in FIG. 9 is the timing of the tip of the arrow. Therefore, when the number of flows in which the transmission deadline exists in the emergency period of the control target flow is counted, the flow B is not counted. The resource allocation controller 41 may count the number of flows in which the transmission deadline exists in the emergency period of the control target flow at the first timing in the normal period. The resource allocation controller 41 may re-calculate the amount of data that the UE 80 can transmit in the emergency period of the control target flow using the number of flows.

As described above, according to the fourth example embodiment, even when a flow has the emergency period that overlaps the emergency period of the control target flow, this flow is not counted as long as the transmission deadline does not exist in the emergency period of the control target flow. Accordingly, when the counting processing according to the fourth example embodiment is performed, the number of counts can be reduced more than that in the second and third example embodiments. As a result, a period in which the radio resources are allocated to the control target flow in the emergency period increases.

Since the period in which the radio resources are allocated to the control target flow increases in the emergency period, the amount of data that should be transmitted in the normal period of the control target flow can be reduced. As a result, it is possible to reduce the radio resources that the eNB 60 will allocate to the control target flow in the normal period, whereby it is possible to allocate more radio resources to the flow regarding the UE 80 having a higher radio quality in the normal period.

Figure 10:
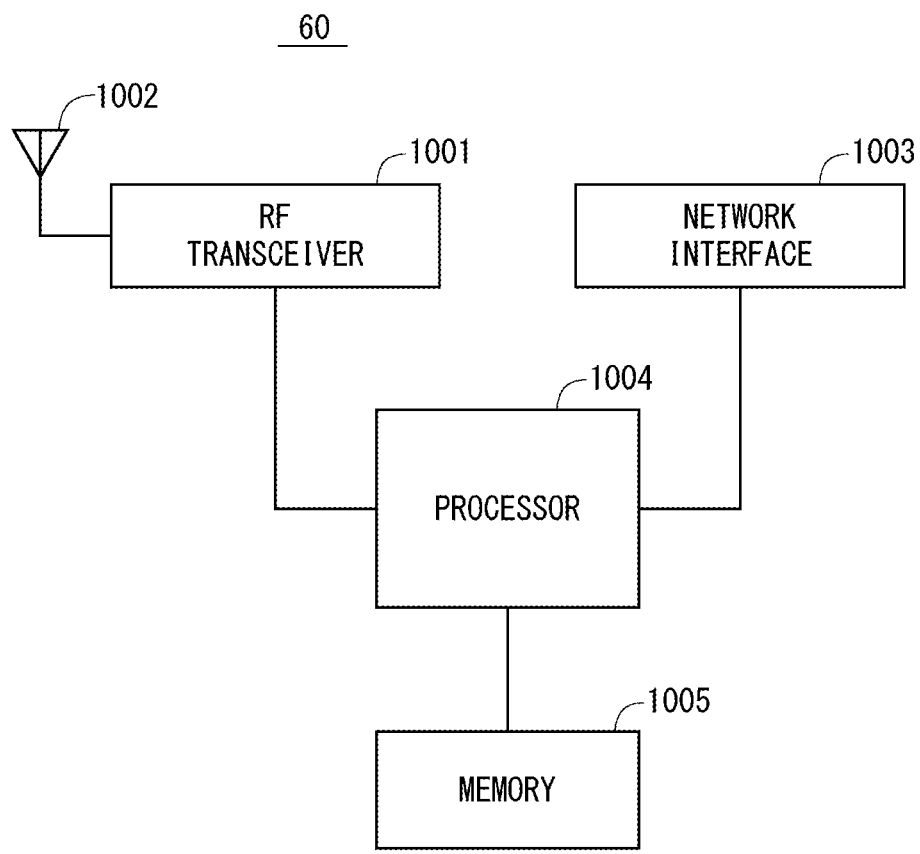
FIG. 10 is a configuration diagram of an eNB according to each of the example embodiments.

The following provides configuration examples of the communication apparatus 10, the MEC server 40, and the eNB 60 according to the above embodiments. FIG. 10 is a block diagram showing a configuration example of the eNB 60. Referring to FIG. 10, the eNB 60 includes an RF transceiver 1001, a network interface 1003, a processor 1004, and a memory 1005. The RF transceiver 1001 performs analog RF signal processing to communicate with UEs. The RF transceiver 1001 may include a plurality of transceivers. The RF transceiver 1001 is coupled to an antenna 1002 and the processor 1004. The RF transceiver 1001 receives modulated symbol data (or OFDM symbol data) from the processor 1004, generates a transmission RF signal, and supplies the transmission RF signal to the antenna 1002. Further, the RF transceiver 1001 generates a baseband reception signal based on a reception RF signal received by the antenna 1002, and supplies the baseband reception signal to the processor 1004.

The network interface 1003 is used to communicate with network nodes (e.g., the gateway 50). The network interface 1003 may include, for example, a network interface card (NIC) conforming to the IEEE 802.3 series.

The processor 1004 performs data-plane processing and control-plane processing including digital baseband signal processing for radio communication. In the case of LTE and LTE-Advanced, for example, the digital baseband signal processing performed by the processor 1004 may include signal processing of a MAC layer and a PHY layer.

The processor 1004 may include a plurality of processors. The processor 1004 may include, for example, a modem processor (e.g., DSP) that performs the digital baseband signal processing and a protocol stack processor (e.g., a CPU or an MPU) that performs the control-plane processing.

The memory 1005 is composed of a combination of a volatile memory and a non-volatile memory. The memory 1005 may include a plurality of memory devices that are physically independent from each other. The volatile memory is, for example, a Static Random Access Memory (SRAM), a Dynamic RAM (DRAM), or a combination thereof. The non-volatile memory is a mask Read Only Memory (MROM), an Electrically Erasable Programmable ROM (EEPROM), a flash memory, a hard disc drive, or any combination thereof. The memory 1005 may include a storage located apart from the processor 1004. In this case, the processor 1004 may access the memory 1005 via the network interface 1003 or an I/O interface (not shown).

The memory 1005 may store a software module (a computer program) including instructions and data to perform the processing by the eNB 60 described in the above embodiments. In some implementations, the processor 1004 may be configured to load the software module from the memory 1005 and execute the loaded software module, thereby performing the processing of the eNB 60 described in the above embodiments.

Figure 11:
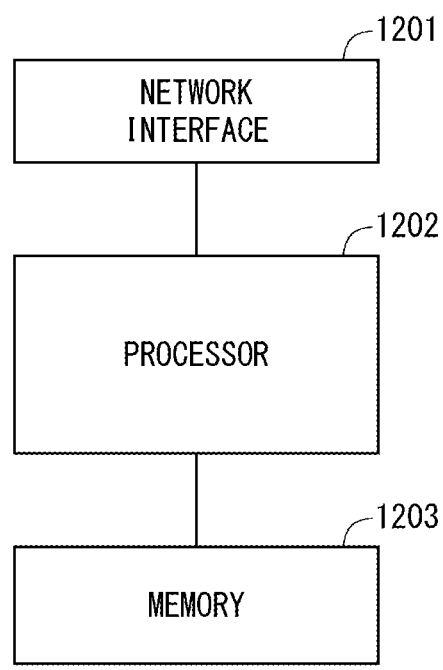
FIG. 11 is a configuration diagram of a communication apparatus and an MEC server according to each of the example embodiments.

FIG. 11 is a block diagram showing a configuration example of the communication apparatus 10 and the MEC server 40. Referring to FIG. 11, the communication apparatus 10 and the MEC server 40 include a network interface 1201, a processor 1202, and a memory 1203. The network interface 1201 is used to communicate with network nodes (e.g., the base station 20). The network interface 1201 may include, for example, a network interface card (NIC) conforming to the IEEE 802.3 series.

The processor 1202 loads the software (computer program) from the memory 1203 and executes the loaded software, thereby performing processing of the communication apparatus 10 and the MEC server 40 described with reference to the sequence diagrams and the flowcharts in the above embodiments. The processor 1202 may be, for example, a microprocessor, an MPU, or a CPU. The processor 1202 may include a plurality of processors.

The processor 1202 performs control-plane processing with data-plane processing including digital baseband signal processing for radio communication. In the case of LTE and LTE-Advanced, for example, the digital baseband signal processing performed by the processor 1004 may include signal processing of a PDCP layer, an RLC layer, and a MAC layer. Further, the signal processing performed by the processor 1202 may include signal processing of a GTP-U·UDP/IP layer in an X2-U interface and an S1-U interface. Further, the control-plane processing performed by the processor 1004 may include processing of an X2AP protocol, an S1-MME protocol, and an RRC protocol.

The processor 1202 may include a plurality of processors. The processor 1004 may include, for example, a modem processor (e.g., a DSP) that performs digital baseband signal processing, a processor (a DSP) that performs signal processing in GTP-U·UDP/IP layer in an X2-U interface and an S1-U interface, and a protocol stack processor (e.g., a CPU or an MPU) that performs the control-plane processing.

The memory 1203 is composed of a combination of a volatile memory and a non-volatile memory. The memory 1203 may include a storage located apart from the processor 1202. In this case, the processor 1202 may access the memory 1203 via an I/O interface (not shown).

In the example shown in FIG. 11, the memory 1203 is used to store software modules. The processor 1202 may load these software modules from the memory 1203 and execute the loaded software modules, thereby performing processing of the communication apparatus 10 and the MEC server 40 described in the above embodiments.

As described above with reference to FIGS. 10 and 11, each of the processors included in the communication apparatus 10, the MEC server 40, and the eNB 60 according to the above embodiments executes one or more programs including instructions to cause a computer to perform an algorithm described with reference to the drawings.

In the above examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above example embodiments and may be changed as appropriate without departing from the spirit of the present disclosure. Further, the present disclosure may be executed by combining each of the example embodiments as appropriate.

REFERENCE SIGNS LIST

10 COMMUNICATION APPARATUS
11 ALLOCATION CONTROLLER
12 CALCULATION UNIT
40 MEC SERVER
41 RESOURCE ALLOCATION CONTROLLER
42 DATA AMOUNT CALCULATION UNIT
43 eNB COMMUNICATION UNIT
50 GATEWAY
60 eNB
61 CORE NETWORK NODE COMMUNICATION UNIT
62 RADIO ENVIRONMENT ACQUISITION UNIT
63 RESOURCE ALLOCATION UNIT
64 RADIO UNIT
70 APPLICATION SERVER
80 UE

The invention claimed is:

1. A communication apparatus comprising:
at least one memory storing instructions, and
at least one processor configured to execute the instructions to: calculate an amount of data that is transmittable by a radio terminal in a first period among transmission periods of a flow in the radio terminal, the first period starting from a predetermined timing to a transmission deadline of the flow and the first period being determined based on a congestion degree; and
subtract the amount of data that is transmittable in the first period from an entire amount of data of the flow to calculate an amount of data that should be transmitted in a second period of the transmission periods of the flow in the radio terminal, the second period being from an occurrence of the flow to the predetermined timing,
wherein the at least one processor is further configured to execute the instructions to calculate the amount of data that is transmittable by the radio terminal in the first period of the control target flow using the number of flows that have a first period in which a period that overlaps the first period of the control target flow exists.

2. The communication apparatus according to claim 1, wherein the at least one processor is further configured to execute the instructions to determine to preferentially allocate radio resources to a control target flow in the radio terminal over other flows in the first period.

3. The communication apparatus according to claim 1, wherein the at least one processor is further configured to execute the instructions to calculate the number of flows that have a first period in which a period that overlaps the first period of the control target flow exists in a first timing in the second period, and re-calculates the amount of data that is transmittable by the radio terminal in the first period of the control target flow using the number of flows that has been calculated.

4. The communication apparatus according to claim 3, wherein the at least one processor is further configured to execute the instructions to re-calculate the amount of data that should be transmitted in the second period based on the amount of data that is transmittable in the first period and re-calculated using the number of flows calculated at a first timing in the second period.

5. The communication apparatus according to claim 1, wherein the at least one processor is further configured to execute the instructions to;
calculate the difference between the amount of data that should be transmitted in the second period and the amount of data transmitted from the occurrence of the flow to a second timing in the second period, and
determine, when a value obtained by dividing the difference by the time from the second timing to the predetermined timing is equal to or larger than a predetermined threshold, to preferentially allocate radio resources to a control target flow in the radio terminal over other flows.

6. The communication apparatus according to claim 1, wherein the at least one processor is further configured to execute the instructions to determine, when the amount of data transmitted from the occurrence of the flow to a second timing in the second period is smaller than the amount of data that should transmitted in the second period, to preferentially allocate radio resources to a control target flow in the radio terminal over other flow.

7. The communication apparatus according to claim 1, wherein the amount of data that should be transmitted in the second period changes with time.

8. The communication apparatus according to claim 1, wherein the at least one processor is further configured to execute the instructions to calculate the amount of data that is transmittable by the radio terminal in the first period of the control target flow using radio quality information of radio resources to be allocated to the radio terminal.

9. The communication apparatus according to claim 8, wherein the at least one processor is further configured to execute the instructions to calculate the amount of data that is transmittable by the radio terminal in the first period of the control target flow using radio quality information on the radio resource at the time the control target flow has occurred or radio quality information estimated as being radio quality information of the first period.

10. The communication apparatus according to claim 1, wherein the at least one processor is further configured to execute the instructions to transmit information regarding the amount of data that the radio terminal should transmit in the second period to a base station.

11. The communication apparatus according to claim 1, wherein the at least one processor is further configured to execute the instructions to control allocation of radio resources based on the amount of data that should be transmitted in the second period.

12. A radio resource allocation method, comprising:
calculating an amount of data that is transmittable by a radio terminal in a first period, among transmission periods of a flow in the radio terminal, the first period starting from a predetermined timing to a transmission deadline of the flow and the first period being determined based on a congestion degree; and subtracting the amount of data that is transmittable in the first period from an entire amount of data of the flow to calculate an amount of data that should be transmitted in a second period of the transmission periods of the flow in the radio terminal, the second period being from an occurrence of the flow to the predetermined timing; and calculating, when the amount of data that is transmittable by the radio terminal in the first period is calculated, the amount of data that is transmittable by the radio terminal in a first period of the control target flow using the number of flows that have a first period in which a period that overlaps the first period of the control target flow exists.

13. The radio resource allocation method according to claim 12, comprising determining to preferentially allocate radio resources to a control target flow in the radio terminal over other flows in the first period.

14. The radio resource allocation method according to claim 12, comprising calculating, when the amount of data that is transmittable by the radio terminal in the first period is calculated, the amount of data that is transmittable by the radio terminal in a first period of the control target flow using the number of flows in which a transmission deadline exists in the first period of the control target flow.

15. The radio resource allocation method according to claim 12, further comprising:

controlling allocation of radio resources based on the amount of data that should be transmitted in the second period.

16. The radio resource allocation method according to claim 12, further comprising:

transmitting information regarding the amount of data that the radio terminal should transmit in the second period to a base station.

\* \* \* \* \*